(12) United States Patent
Gondo et al.

(10) Patent No.: US 7,500,180 B2
(45) Date of Patent: Mar. 3, 2009

(54) APPARATUS FOR COLLECTING INFORMATION AND MANAGING ACCESS RIGHTS

(75) Inventors: Hisahito Gondo, Kanagawa (JP); Noriko Aoki, Tokyo (JP); Jun Nishimura, Tokyo (JP); Daisuke Kawaguchi, Tokyo (JP); Yukihiro Hoshino, Tokyo (JP); Manabu Idei, Kanagawa (JP)

(73) Assignee: Sony Corporation, Tokyo (JP)

( * ) Notice: Subject to any disclaimer, the term of this patent is extended or adjusted under 35 U.S.C. 154(b) by 674 days.

(21) Appl. No.: 10/244,221

(22) Filed: Sep. 16, 2002

(65) Prior Publication Data

US 2003/0079186 A1    Apr. 24, 2003

(30) Foreign Application Priority Data

Sep. 17, 2001    (JP) .............................. 2001-281688

(51) Int. Cl.
    G06F 17/30    (2006.01)
(52) U.S. Cl. ...................... 715/230; 715/229; 715/741; 715/744; 715/775; 709/206
(58) Field of Classification Search .................. 715/511, 715/512, 229, 230, 741, 744, 775; 707/3, 707/4; 726/27
    See application file for complete search history.

(56) References Cited

U.S. PATENT DOCUMENTS 5,948,040 A * 9/1999 DeLorme et al. ............ 701/201
6,079,863 A * 6/2000 Furukawa et al. ............... 705/5
6,134,534 A * 10/2000 Walker et al. .................. 705/26
6,745,367 B1 * 6/2004 Bates et al. ................... 715/500
7,275,061 B1 * 9/2007 Kon et al. .................... 707/102
2002/0143692 A1 * 10/2002 Heimermann et al. ......... 705/37

* cited by examiner

Primary Examiner—Stephen S Hong
Assistant Examiner—Matthew J Ludwig
(74) Attorney, Agent, or Firm—Finnegan, Henderson, Farabow, Garrett & Dunner, L.L.P.

(57) ABSTRACT

An information collecting/providing system provides information in a manner that allows information to be easily registered, viewed, developed, and reused, even when a large amount of various kinds of information is collected and dealt with. The information collecting/providing system includes one or more terminal devices, an information collection/management apparatus connectable to the one or more terminal devices via a communication network, and an collected-information database connected to the information collection/management apparatus. The information collection/management apparatus receives collected information from the one or more terminal devices and stores the received information into the collected-information database. If the information collection/management apparatus receives a request from a terminal device, the information collection/management apparatus transmits, to the terminal device, collected information allowed for a user of the terminal device to read.

6 Claims, 12 Drawing Sheets

APPARATUS FOR COLLECTING INFORMATION AND MANAGING ACCESS RIGHTS

BACKGROUND OF THE INVENTION

1. Field of the Invention

The present invention relates to an information collection/management system, an information collection/management apparatus, a terminal device for use in such a system, a storage medium in which collected information is stored, a method for allowing collected information to be viewed, a program for realizing or executing such a system, apparatus, device, or method, and a storage medium in which such a program is stored.

2. Description of the Related Art

In general, collection and use of information are important in businesses of companies or the like. In fact, there are many instances in which acquisition of important information has brought about success in businesses.

Of various sources/channels through which companies obtain information, sales persons having direct contact with end users and shops can provide particularly important information. There is a high possibility that sales persons working at various sales offices located over the whole country can obtain newest information from markets through everyday sales activities. In many cases, information obtained by sales persons and provided to other company members is very important.

Making full use of such important information can bring great profits to companies. However, if information obtained by sales persons is not effectively distributed among other company members, important information is kept by individual sales persons or in limited small number of company members without being used effectively. In a case in which information is transferred only by means of oral reports directly or via telephone without being written in documents, it is difficult to develop or reuse the information.

Thus, it is needed to establish a system/method for providing information in a manner that allows the information to be further developed or reused.

To establish such a system for providing information in a developable/reusable manner, it is known to use e-mails, file servers, and a combination of a Web server and Web browsers.

E-mails allow push-type one-to-one or one-to-many information transmission. Providing of information using e-mails is advantageous in capability of two-way communications, easiness in use, and high popularity.

The file server is a server for providing a file in accordance with the FTP protocol. The file server includes directories or folders assigned to respective organizations/institutions, purposes, and categories of information, and a great number of various kinds of large-size electronic files are stored in the corresponding directories or folders such that many users (company members) can freely access the file server to obtain necessary files and thus can share the information.

A combination of a Web server and Web browsers is advantageous in that the system can be properly configured or modified depending on the purpose and in that various types of data such as text data and image data can be dealt with and files can be downloaded. This is important in particular for use in pull-type information transmission. In general, browsers are distributed without charge, and thus it is easy to establish a system using a combination of a Web server and Web browsers.

However, the information providing system according to the conventional technique has problems as described below.

In a case in which information is distributed using e-mails, keywords used to categorize information are limited to titles, the degree of importance, or the like, and information cannot be properly classified into as many categories as needed to reuse or retrieve information.

When information which has been already transmitted is updated or modified, receivers have to re-receive the updated information and replace the current information with the updated information received. This makes it difficult to fully distribute updated information. Another problem is the upper limit on the size of an attached file, which makes it necessary to a large-size file to be divided into a plurality of parts.

In a case in which acquired information is reported via e-mails, although the information is shared by particular individuals, the information is not effectively reused by a large number of persons. Besides, there is even a possibility that an e-mail is not opened by a receiver and information transmitted via the e-mail is not used at all.

In the case of file servers, interfaces are not user-friendly compared with Web browsers, and retrieval is performed by using a function provided by an OS (Operating System) or application software. This is inconvenient for users (company members), and thus many users are reluctant to use file servers. Even in the case in which most reports are presented using electronic files, if some reports are presented in the form of printed documents or presented by attaching files to mails addressed to particular individuals, information is shared only within a limited range.

In the case of the combination of a Web server and Web browsers, transmission of information is generally possible only in one direction, and two-way transmission among users is not possible. Besides, to transmit information, an information sender must have knowledge how to produce an HTML document. This makes it difficult for all company members to use such a system. Furthermore, in this system using the combination of the Web server and Web browsers, because information transmission is performed in the pull-type manner for users, a special job is needed to be performed by users to obtain necessary information and to share information among users.

Even in a case in which information is distributed and stored using e-mails and electronic files, if different systems such as a file server, e-mails, and a combination of a Web server and Web browsers are used in the same company, these different systems cannot be managed in a systematic manner. In such a case, information is stored in a simple manner, and a troublesome and time-consuming job is needed to classify or analyze information.

SUMMARY OF THE INVENTION

It is an object of the present invention to provide a technique of providing information in a manner that allows information to be easily registered, viewed, developed, and reused, even when a large amount of various kinds of information is collected and dealt with in companies or the like.

The object is achieved by the present invention as described below.

According to an aspect of the present invention, there is provided an information collection/management system including at least one terminal device, an information collection/management apparatus connectable to the terminal device via a communication network, and a collected-information database connected to the information collection/management apparatus.

The terminal device is capable of accessing the information collection/management apparatus via the communication network and registering collected information into the collected-information database via the information collection/management apparatus, and the terminal device is also capable of issuing a request for viewing collected information stored in the collected-information database by accessing the information collection/management apparatus via the communication network, receiving information extracted from the collected-information database in accordance with the request, and displaying the received information in a form understandable by a user.

The collected-information database includes at least one or more sub-databases, each of which is assigned a category of collected information and stores collected information classified into the assigned category.

The information collection/management apparatus receives collected information transmitted from a terminal device and stores the received information into the collected-information database, and, in response to a request from a terminal device, the information collection/management apparatus transmits, to the terminal device, collected information allowed to be viewed by a user of the terminal device.

According to another aspect of the present invention, there is provided an information collection/management apparatus including information registration means, view request response means, and access right management means.

If the information registration means receives an information registration request from a terminal device, the information registration means generates an interface for use in registering collected information, transmits the generated at-a-glance information to the terminal device, and stores, into predetermined storage means, collected information transmitted from the terminal device in response to the transmission of the interface.

The view request response means generates at-a-glance information in response to a collected-information view request from a terminal device, transmits the generated at-a-glance information to the terminal device, acquires collected information indicated by information identifying collected information returned by the terminal device in response to the transmission of the at-a-glance information, and transmits the resultant interface to the terminal device.

The information collection/management apparatus may further include notification transmission means for, if collected information received from a terminal device includes information specifying a mail receiver, acquiring information regarding the specified mail receiver from the information registration means and generating an electronic mail addressed to the specified mail receiver.

Herein, the "specified mail receiver" is a party/person specified, by the information registrant, as a receiver of a message indicating that information has been registered, or a party/person (such as a superior of the information registrant) who is related, in advance, to the information registrant.

The access right management means supplies, to the view request response means, information indicating which piece of collected information is allowed to be viewed by a user of a terminal device.

According to still another aspect of the present invention, there is provided a terminal device including information presentation/input interface providing means, and input means.

The information presentation/input interface providing means provides an interface for use by a user to register collected information and displays the received information in a form understandable by a user.

The input means is used by a user to input information to the interface provided by the information presentation/input interface providing means.

The collected information provided by the information presentation/input interface providing means may include an object for use in registering new collected information relevant to the former collected information.

According to still another aspect of the present invention, there is provided a storage medium in which collected information is stored, wherein the collected information includes a filed for storing related-information identifier identifying other collected information to which the former collected information is related, and also includes a score information field for storing a score evaluated for said other collected information.

According to still another aspect of the present invention, there is provided a method of allowing a user to view collected information stored in a collected-information database, the method including the steps of identifying collected information which is allowed to be viewed by the user, inquiring of collected-information database about the collected information identified in the identification step to obtain information regarding collected information allowed to be viewed, generating at-a-glance information on the basis of the obtained information regarding collected information allowed to be viewed transmitting the resultant at-a-glance information to a terminal device, requesting the collected-information database to transmit collected information specified by the user from the at-a-glance information, and receiving the data of the specified collected information, and transmitting the received data of the specified collected information to the terminal device.

The system, the apparatus, and the method according to the present invention may be realized or accomplished by executing a particular program on a computer. Thus, such a program falls within the scope of the present invention. The program may be stored in a computer-readable storage medium, and such a storage medium falls within the scope of the present invention.

DESCRIPTION OF THE PREFERRED EMBODIMENTS

Figure 1:
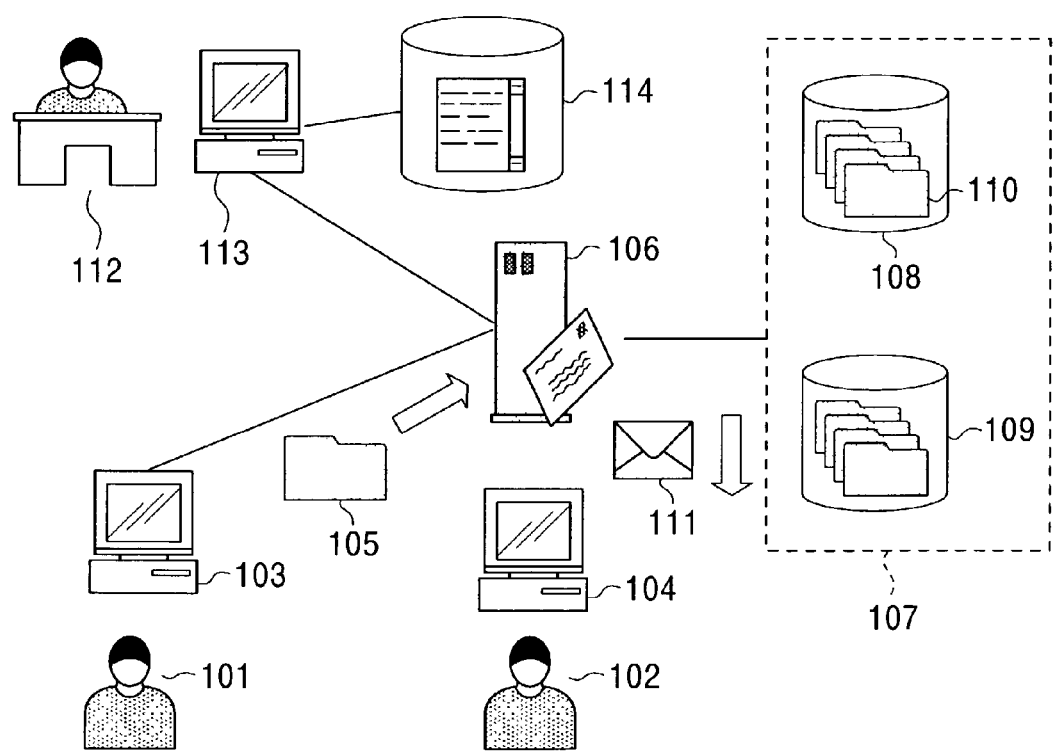
FIG. 1 is a diagram showing a flow of information in an information collection/management model according to the present invention.
Figure 2:
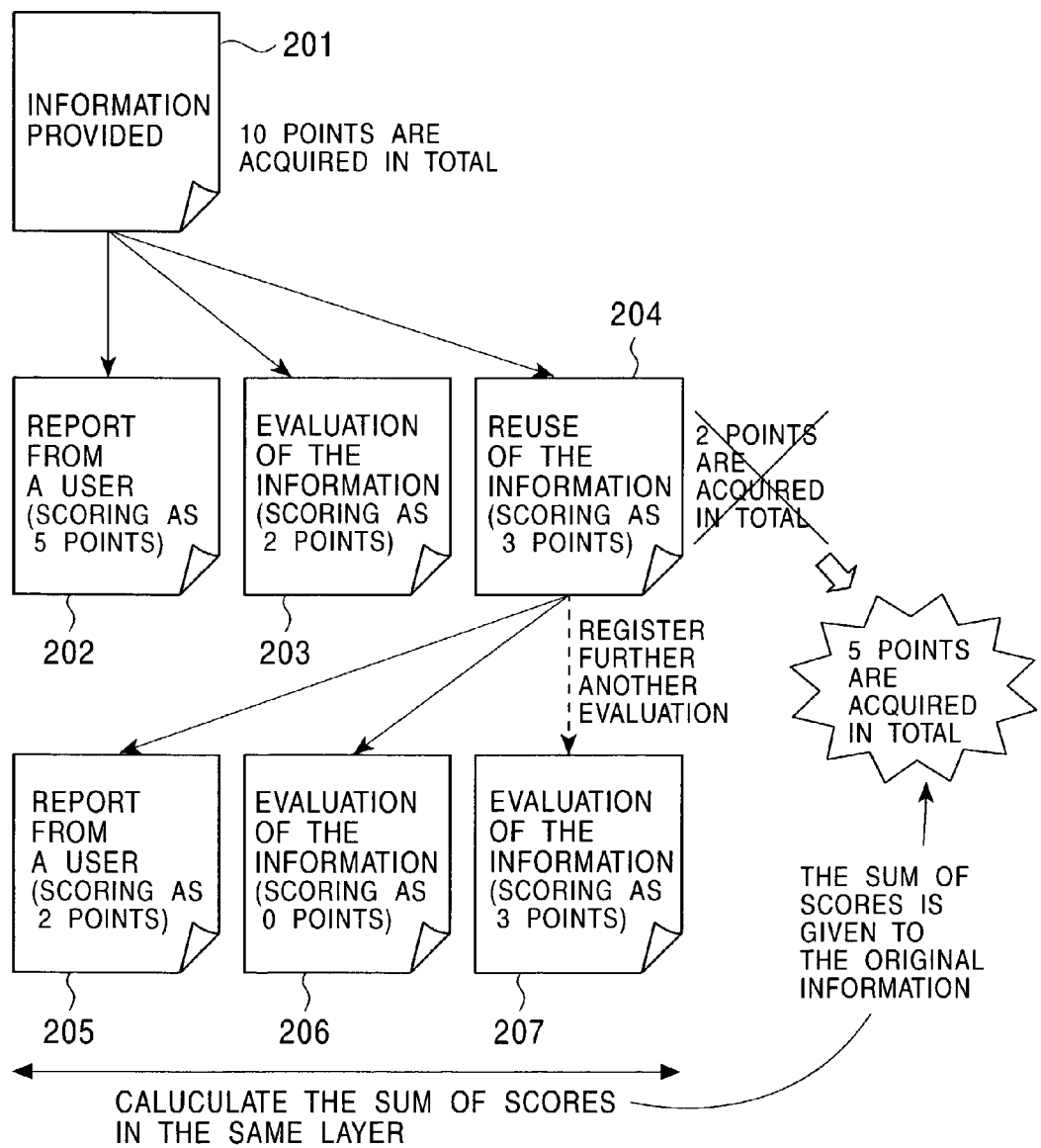
FIG. 2 is a diagram showing a manner of applying a score to information in the information collection/management model according to the present invention.

Concepts of Collection/management of Information According to the Present Invention An information collection/management model according to the present invention is described below with reference to FIGS. 1 and 2. FIG. 1 is a diagram showing a flow of information in the information collection/management model. FIG. 2 is a diagram showing a manner of applying a score to information in the information collection/management model.

In this information collection/management model, as shown in FIG. 1, users 101 and 102, who are generally sales persons of a company, collect information from a market or the like (hereinafter, such information refers to as collected information) and transmit the collected information to an information collection/management apparatus 106 using their terminal devices 103 and 104, respectively. That is, each time a user or a contributor collects information, he/she inputs the collected information in a predetermined form so that the information is transmitted in real time. If accessing from terminals is limited to Web-based accessing, it becomes possible for users to transmit information without concern for the terminal environment.

The collected information may include, in addition to text information, various types of electronic files (such as an image file and an HTML file). This allows information in various forms, such as image information, a planning document, a proposal document, or the like to be attached. In many categories in businesses, attachment of image information makes it possible to express information in a more easily understandable fashion.

Upon receiving the information, the information collection/management apparatus 106 stores it as collected information into the collected-information database 107. The collected-information database 107 classifies the collected information by the business category and stores it as registered information 110 in the form of card data separately depending on the business category. The collected-information database 107 includes a plurality of sub-databases 108 and 109, wherein a category (such as new products, existing products, or troubles/complaints) of collected information is assigned to each sub-database, and each sub-database stores collected information classified into the assigned category.

Right of access is prescribed so as to indicate which users are allowed to access to which sub-databases. The right of access is determined, for example, by a person who operates the information collection/management apparatus (such as an information system manager).

Users 101 and 102 are allowed to access the information collection/management apparatus via their terminal device to view the collected information stored in the collected-information database 107. Herein note that the information collection/management apparatus extracts only collected information a user has a right of access to and provides the extracted collected information to the user. That is, the collected information stored in a sub-database to which a user does not have a right of access is hidden from the user. For users, the existence of the plurality of sub-databases is hidden, and the collected-information database 107 seems to be a single database. Thus, users can obtain and view information needed in businesses without awareness of the sub-databases.

The information collection/management apparatus collects information acquired by users from markets via their everyday sales activities. If the information collection/management apparatus receives an information view request from a user, the information collection/management apparatus classifies collected information provided by a large number of users and automatically presents the resultant collected information.

When a user transmits information to the information collection/management apparatus, the collected information may be transmitted via mails 111 to users who needs the information. That is, a message indicating that the information has been registered may be sent to particular users specified by an information registrant.

Alternatively, in the present information collection/management model, when collected information is registered or when some response (such as a return message) to already-registered collected information is received, a mail may be automatically transmitted to one or more predetermined mail receivers such as a superior of the information registrant or a marketing person specified by a category flag determined depending on the content of the registered information, in accordance with related mail address information stored in a data table (related mail address table) prepared in each sub-database.

When a user views collected information, the user may create new collected information by adding some useful information thereto. For example, when a user views collected information indicating an effective manner of displaying products, provided by another user, the user may get an idea of improving the manner and may transmit new collected information regarding the improved manner.

The collected and stored information may be viewed via terminal devices 113 by company members 112 in various departments or sections such as a personnel department or a marketing department.

Using the collected information, a marketing staff member may combine qualitative information provided from information registrants (users) with quantitative information such as sales data of a particular category thereby creating marketing data having both qualitative and quantitative aspects.

A personnel staff member can systematically analyze the contents of collected and registered information provided by users and can use the result of the analysis in business management or personnel management. For example, via the analysis, a certain company member may turn out to have high ability of collecting useful information, and another company member may turn out to have high ability of improving existing information. The result of analysis may be reflected in personnel data 114 on the basis of which company members may be evaluated and personnel changes may be determined. That is, by combining collected information provided by particular members or sections of a company with personnel information, business and personnel management can be performed in a more effective manner.

A user may create new information by using existing collected information. Relationships among registered pieces of collected information are recorded and managed, and those pieces of collected information related to each other are displayed, for example, in the form of a tree structure so that a user can visually understand the relationships among those pieces of collected information when the user registers or views information.

Furthermore, it becomes possible to evaluate collected information on the basis of scores given by users. This also makes it possible to quantitatively evaluate departments, sections, or persons in a company.

FIG. 2 is a diagram showing relationships among pieces of collected information and scores given to those pieces of collected information.

First, a piece of collected information 201 is registered by a user. Another piece of collected information 202 regarding use of the collected information 201 is transmitted from another user to the information collection/management apparatus and registered therein. Similarly, collected information 203 regarding evaluation of the collected information 201, and collected information 204 regarding reuse of the collected information 201 are transmitted to the information collection/management apparatus and registered therein.

Those pieces of collected information 202, 203, and 204 are registered as information related to the collected information 201. Thus, if a user browses collected information, pieces of collected information 201, 202, 203, and 204 are displayed such that the user can understand that the pieces of collected information 202, 203, and 204 are child information of the collected information 201.

The relationships among collected information may be described in a multilevel hierarchical manner. For example, in response to the child collected information 204, collected information 205 regarding reuse of the collected information 204, collected information 206 regarding evaluation of the collected information 204, and collected information 207 regarding reuse of the collected information 204 may be transmitted from other users to the information collection/management apparatus and those pieces of information may be registered therein.

Those pieces of collected information 205, 206, and 207 are registered as information related to the collected information 204. When a user browses collected information, those pieces of collected information 204, 205, 206, and 207 are displayed such that the user can understand that the pieces of collected information 205, 206, and 207 are child information of the collected information 204.

Each piece of collected information is evaluated and given a score in units of points indicating the result of evaluation. In the specific example shown in FIG. 2, the registrant of the collected information 202 gives a score of 5 points to the collected information 201, the registrant of the collected information 203 gives a score of 2 points to the collected information 201, and the registrant of the collected information 204 gives a score of 3 points to the collected information 201. Those points (10 points in total) are given to the user who has registered the collected information 201. Similarly, the user who has registered the collected information 204 obtains 5 points.

By recording the total score given to each user, it becomes possible to quantitatively evaluate the usefulness of information provided by each user.

The collected information may be provided to a product development department or a planning department so that information indicating requests for improvements or complaints about products can be shared in real time thereby making it possible to quickly provide feedback and reflect the information in planning of development of following products.

The above-described information collection/management model according to the present invention can be embodied into the form of a system as described below.

Example of Information Collecting/providing System

Figure 3:
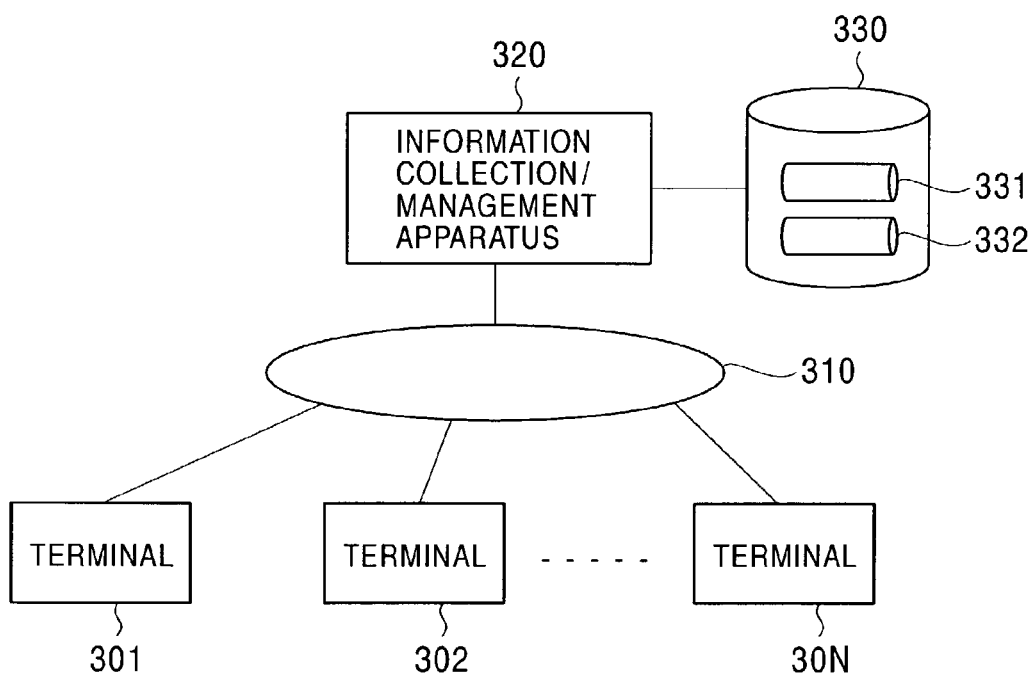
FIG. 3 is a block diagram showing an example of a construction of an information collecting/providing system according to an embodiment.

An example of a construction of the information collecting/providing system according to the present embodiment is described below. FIG. 3 is a block diagram showing an example of a construction of an information collecting/providing system according to an embodiment.

This information collecting/providing system includes terminal devices 301, 302, . . . , 30N, an information collection/management apparatus 320 connectable to these terminal devices via a communication network 310, and a collected-information database 330 connected to the information collection/management apparatus 320.

Terminal Device

Each terminal device is an information processing apparatus capable of accessing the information collection/management apparatus 320 via the communication network 310, using browser software which has capabilities of receiving electronic mails, making Web connections, and browsing Web documents. Specific examples of terminal devices include a portable telephone, a computer, a workstation, a mobile terminal or a mobile communication terminal, and a PDA (Personal Digital Assistant).

Each of the terminal devices 301, 302, . . . , 30N is capable of accessing the information collection/management apparatus 320 via the communication network 310 to register collected information in the form of a Web document (such as an HTML document or an XML document) into the collected-information database 330 via the information collection/management apparatus 320. Each of the terminal devices 301, 302, . . . , 30N is also capable of issuing a request for viewing collected information to the information collection/management apparatus 320, receiving collected information which is extracted by the information collection/management apparatus 404 from the collected-information database 330 in response to the request and transmitted from the information collection/management apparatus 404, and displaying the received information in a form understandable by users.

Herein, the "user" refers to a human operator of a terminal device, who registers, views, and/or manages information using the information collection/management apparatus 330.

Figure 4:
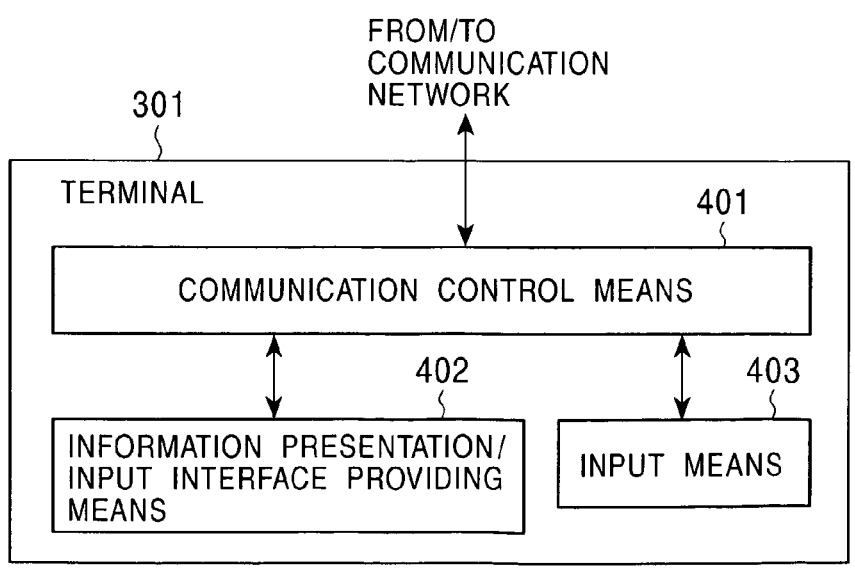
FIG. 4 is a block diagram showing an example of a construction of a terminal device.

FIG. 4 is a block diagram showing an example of a construction of a terminal device. Hereinafter, the terminal device 301 is taken as a representative terminal device.

The terminal device 301 includes communication control means 401, information presentation/input interface providing means 402, and information input means 403. The communication control means 401 has a capability of transmitting/receiving data to/from the information collection/management apparatus 320 and includes software for dealing with a communication protocol such as TCP/IP and also includes hardware such as a memory and a CPU for executing the software. The information presentation/input interface providing means 402 provides a user interface for use by a user to register collected information. The information presentation/input interface providing means 402 also prevents collected information in a manner that allows a user to view and understand the collected information. The information presentation/input interface providing means 402 may be formed of software called a browser, hardware such as a CPU and a memory for executing the software, and a display (such as a liquid crystal display or a CRT display) for displaying collected information and an input interface using the browsing software.

Communication Network

The communication network 310 may be of any type, such as a cable network, a wireless network, a dedicated communication line, or a switched line, as long as the communication network is capable of transmitting information between devices when a session is established between devices connected to the communication network 310. The communication network 310 may be a combination of plurality of networks connected via gateways, as is the case with the Internet. In this case, the plurality of networks are not necessarily needed to be connected directly to a main network called a backbone, but may be temporarily connected by means of a PPP connection or the like, as long as transmission of information is possible when a session is established. The communication network may also be a network realized by fixedly extending dedicated lines without using an exchange.

Collected-information Database

The collected-information database 330 has a function of storing collected information and providing collected information in response to a request from the information collection/management apparatus 320.

The collected-information database 330 includes a plurality of sub-databases 331, 332, and so on, wherein a category (such as new products, existing products, or troubles/complaints) of collected information is assigned to each sub-database, and each sub-database stores collected information classified into the assigned category.

Figure 5:
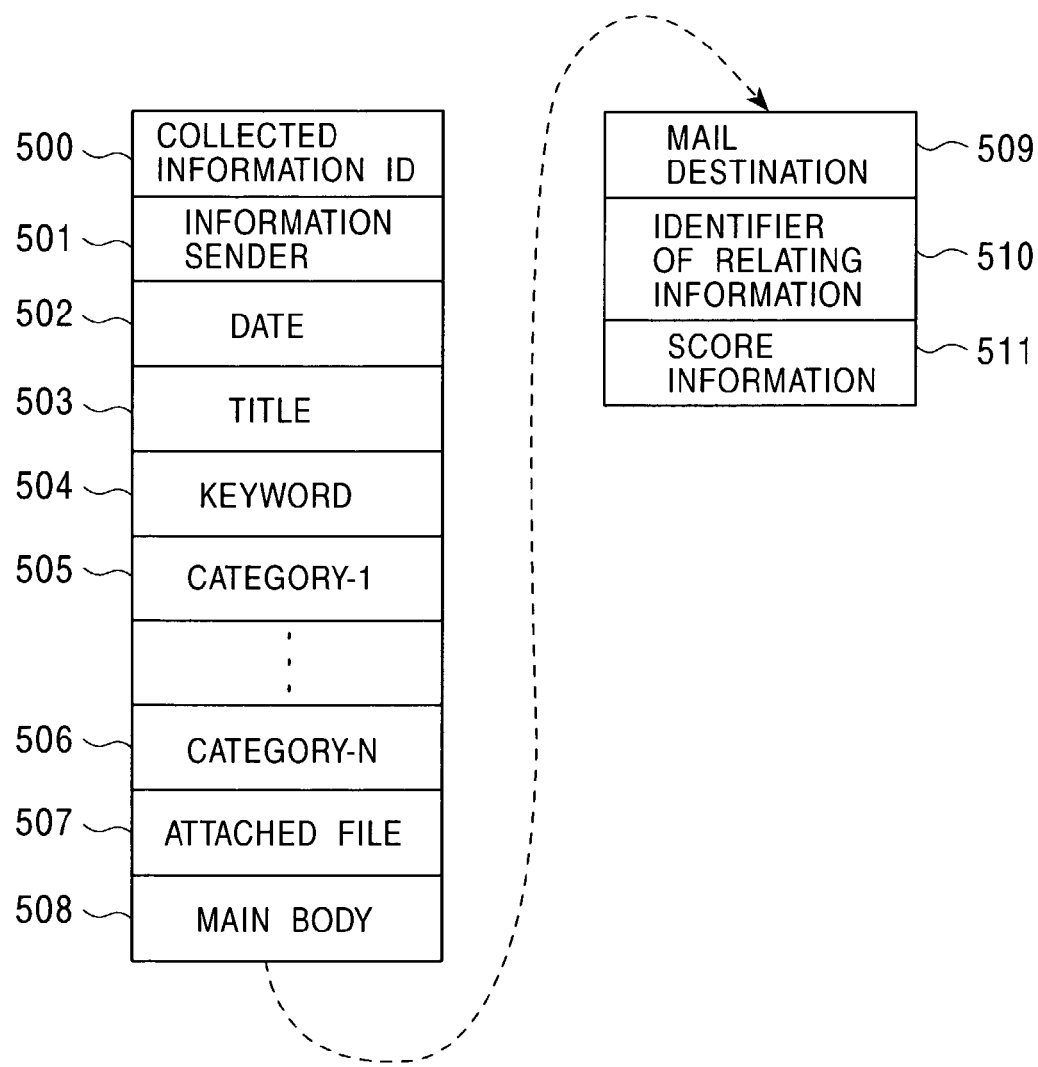
FIG. 5 is a diagram showing an example of a data format of collected information.

FIG. 5 shows an example of a format of collected information data. The collected information data includes a plurality of fields such as a sender field 501, a date field 502, a title field 503, a keyword field 504, category fields 505 to 506, an attached-file field 507, a main body field 508, a mail destination field 509, related-information identifier field 510, and a score information field 511.

In the sender field 501, stored is information (e.g., a company member ID) indicating a sender or a contributor of collected information. In the date field 502, stored is data indicating a date of registering or collecting the information. In the title field 503, a title of the information determined by a user is stored. In the keyword field 504, a keyword determined by the user for the collected information is stored. The keyword stored in the keyword field 504 is used mainly as an index in retrieval of information. In the category fields 505 to 506, categories or attributes of the collected information are stored. One of the category fields 505 to 506 is used to store information indicating a sub-database in which the present collected information is stored. A category field may be used to store information indicating a "product item" of the present collected information. In a case in which product item information is stored, an information sender may input data indicating a product item into the "product item" input field of an input interface, and a marketing person may extract only collected information related to a product category of interest to the marketing person by performing filtering in accordance with the item information. In a case in which a file is attached to collected information, information (such as a file name and a path name) identifying the attached file is stored in the attached-file field 507. In the main body field 508, text information representing the content of the collected information is stored. In the mail destination field 509, stored is information indicating a mail destination (such as an electronic mail address) specified by a user as a destination to which the present collected information is to be transmitted. The related-information identifier field 510 is used, when the current collected information is information (child information, hereinafter referred to as "related information") related to another piece of collected information (parent collected information, hereinafter referred to as "original information"), to describe information (such as collected information identification number) identifying the original information. In the score information field 511, a score given to the original information is stored.

Information Collection/management Apparatus

The information collection/management apparatus 320 is an information processing apparatus such as a computer or a workstation having a communication capability and may include a central processing unit (CPU), a main memory (RAM), a read only memory (ROM), an input/output (I/O) device, and a hard disk drive. In the ROM or the hard disk drive, there is stored a program for causing the information processing apparatus to function as the information collection/management apparatus 320 or for causing a computer to executing a method of registering collected information or a method of allowing a user to view collected information. The program is loaded into a main memory, and the program is executed by the CPU so as to realize the information collection/management apparatus 320 or to execute the method of registering collected information or the method of allowing a user to view collected information. The program is not necessarily needed to be stored in a storage device disposed in the information collection/management apparatus 320, but the program may be provided from an external device (for example, a server of an ASP (Application Service Provider)) and may be loaded into the main memory.

The information collection/management apparatus 320 receives collected information transmitted from terminal devices 301, 302, . . . , 30N, and stores the received information in the collected-information database 330. If the information collection/management apparatus 320 receives a request from a terminal device, the information collection/management apparatus 320 transmits, to the terminal device, collected information that is allowed to be viewed by the user of the terminal device.

Example of the Configuration of the Information Collecting/providing Apparatus

Figure 6:
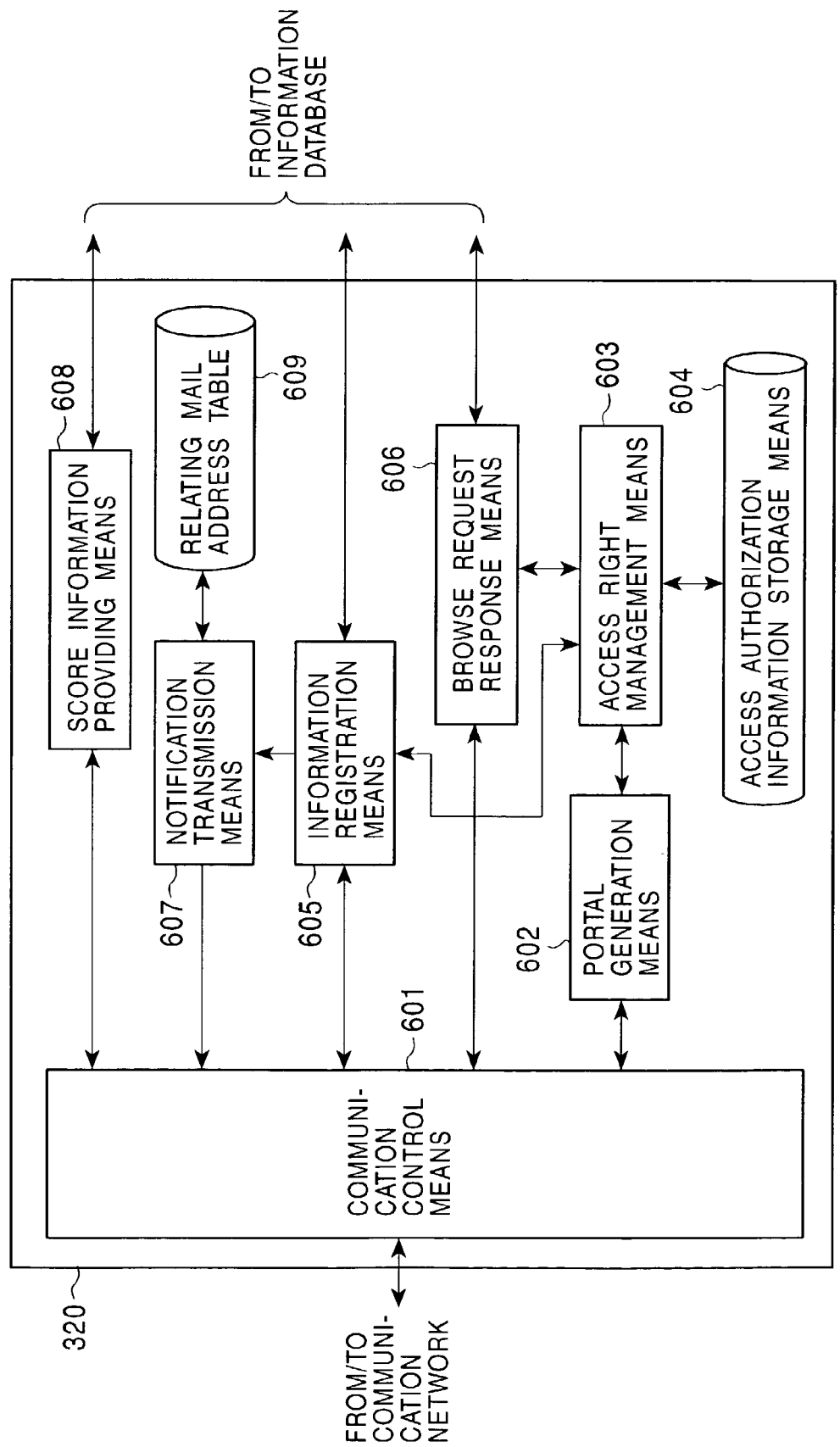
FIG. 6 is a block diagram showing an example of a construction of an information collection/management apparatus according to an embodiment.

FIG. 6 is a block diagram showing an example of a construction of the information collection/management apparatus 320 according to the present embodiment.

The information collection/management apparatus 320 includes communication control means 601, portal generation means 602, access right management means 603, access right information storage means 604, information registration means 605, notification transmission means 607, view request response means 606, and score information providing means 608.

The communication control means 601 has a capability of transmitting/receiving data to/from the terminal devices, and includes software for dealing with a communication protocol such as TCP/IP and also includes hardware such as a memory and a CPU for executing the software.

The portal generation means 602 has a function of, in response to an access from a terminal device, generating a Web document serving as an interface for use by a user to register and browse collected information and transmitting the resultant Web document to the terminal device via the communication control means 601. The portal generation means 602 inquires of the access right management means 603 whether an access requester has right to access to collected information, and allows the access only if the access requester has right to access. This makes it possible to prevent collected information from leaking to the outside.

If the information registration means 605 receives an information registration request from a terminal device, the information registration means generates a Web document serving as an interface for registering collected information and transmits the resultant Web document o the terminal device via the communication control means 601. When the information registration means 605 receives collected information transmitted by the terminal device in response to the transmission of the Web document, the information registration means 605 stores the received collected information into a proper sub-database.

When collected information to be registered includes data indicating specified mail receiver, the notification transmission means 607 generates an electronic mail for informing a user specified by the data described in the mail destination field that the collected information has been registered, and transmits the electronic mail to a terminal device specified as the destination via the communication control means 601.

Furthermore, the notification transmission means 607 receives information (such as an information sender ID) identifying an information registrant from the information registration means 605, acquiring a mail address of a user related to the information identifying the information registrant from the related mail address table 609, generating an electronic mail for informing a user corresponding to the acquired mail address that the information has been registered, and transmitting the generated electronic mail to a terminal device specified by the mail address via the communication control means 601.

The related mail address table 609 stores mails addresses of users related to respective information registrants. Herein, the "related users" are users specified by an information registrant as receives of a message indicating that information has been registered or users (such as a superior of an information registrant or a marketing person in charge of a product dealt with by the user).

Although, in the present embodiment, the related mail address table 609 is disposed in the information collection/management apparatus, the location of the related mail address table 609 is not limited to the inside of the information collection/management apparatus. The related mail address table 609 may be disposed as a part of the collected-information database 330, or may be disposed in each of the sub-databases 331, 332, and so on.

The collected information may be directly attached to the electronic mail described above, or information (such as URL of the collected information) identifying the collected information may be described in the electronic mail so that a receive can view the collected information by clicking the URL or the like.

When a request for viewing collected information is issued from a terminal device, the view request response means 606 generates information indicating which pieces of collected information are allowed to be viewed by the user of the terminal device (herein, such information may be generated in an at-a-glance form having a tree structure, and such information is referred to as "at-a-glance information") and transmits it to the terminal device via the communication control means 601. If the view request response means 606 receives information (collected information ID) which is transmitted from the terminal device in response and which identifies collected information, the view request response means 606 acquires collected information specified by the collected information ID from a proper sub-database of the collected-information database 330 and transmits the acquired information to the terminal device.

When at-a-glance information is generated, the view request response means 606 inquires of the access right management means 603 which collected information is allowed to be viewed by the user.

The access right management means 603 refers to the access right information storage means 604 to determine which sub-database is allowed to be viewed by the user and transmits data indicating which sub-database is allowed to be viewed by the user to the view request response means 606. The view request response means 606 transmits collected information to the terminal device such that only the collected information stored in the sub-database specified by the message can be viewed by the user of the terminal device.

Although, in the embodiment described above, the access right information storage means 604 is disposed as one component in the information collection/management apparatus 320, the access right information storage means 604 is not necessarily required, but information regarding right of access may be described each sub-database, and the view request response means 606 may inquire of each sub-database about the right of access.

When a request for viewing score information is issued from a terminal device, the score information providing means 608 provides score information to the terminal device.

It is desirable to provide total scores calculated and sorted from various viewpoints, such as a viewpoint of contributors or a viewpoint of contents of information. In this case, the score information providing means 608 may store a plurality of filtering conditions so that a user can select a desired filtering condition.

In order that only personnel stall members can view score information, the score information providing means 608 may check whether a user requesting for viewing score information is a personnel staff member on the basis of, for example, the terminal device ID.

Operation of the Information Collecting/providing Apparatus

Figure 7:
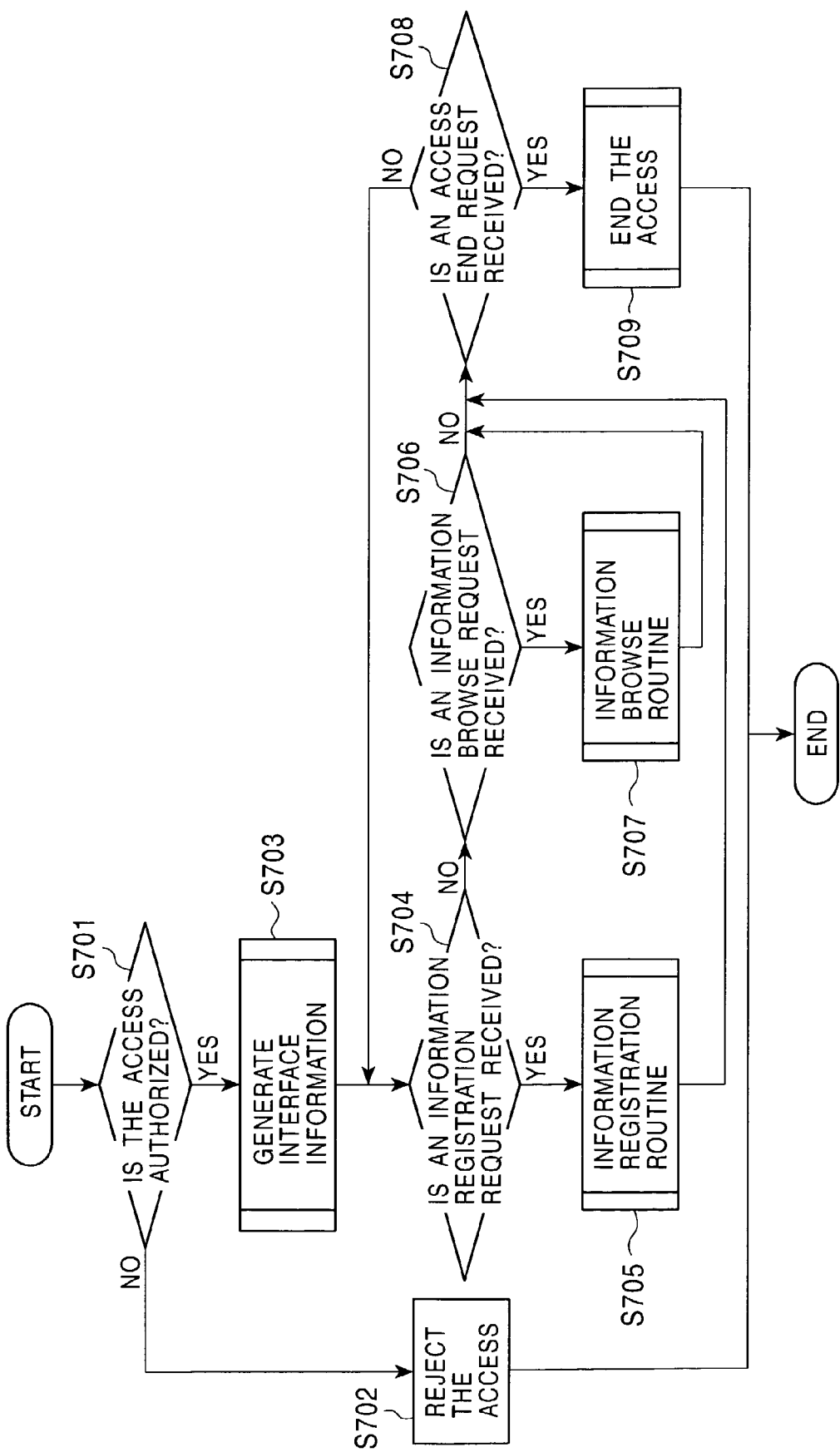
FIG. 7 is a flow chart showing an example of an operation of the information collection/management apparatus.

An operation of the information collecting/providing apparatus 320 is described below. FIG. 7 is a flow chart showing an example of the operation of the information collection/management apparatus 320.

If the information collecting/providing apparatus 320 is accessed by a terminal device, portal providing means of the information collecting/providing apparatus 320 checks whether the user of the terminal device is an authorized user having right of access (step 701). In a case in which the user does not have right of access, the information collecting/providing apparatus 320 rejects the access and terminates the process (step 702). If the user has right of access, the portal providing means 602 generates a Web document serving as an interface for registering and browsing collected information and transmits the generated Web document to the terminal device via communication control means 601 (step 703).

Figure 8:
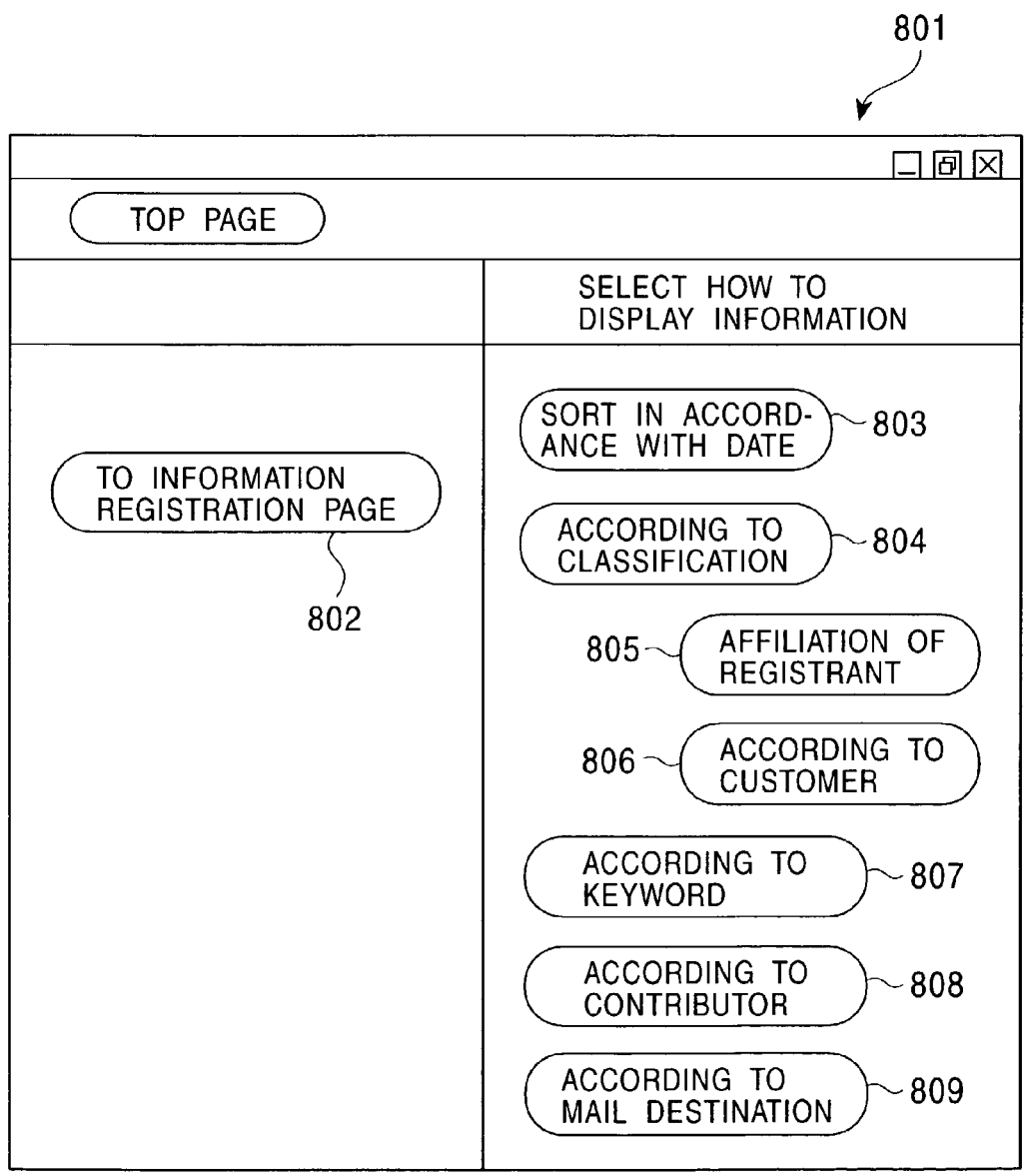
FIG. 8 is a diagram showing an example of an interface for registering and browsing collected information.

FIG. 8 shows an example of the interface for registering and browsing collected information. In FIG. 8, reference numeral 801 denotes an interface screen in the form of a window displayed on the terminal device. The interface screen 801 includes an object 802 for issuing an information registration request and objects 803 to 809 for issuing an information view request. The user can activate one of these objects by using input means such as a pointing device or a keyboard. If an object is activated, the object performs a predetermined operation (for example, an object 802 transmits an information registration request, and an object 803 issues a request for collected information listed in the order of registration date).

Referring again to FIG. 7, if the information collection/management apparatus 320 receives an information registration request from the terminal (step 704), the information collection/management apparatus 320 performs an information registration process (step 705).

Figure 9:
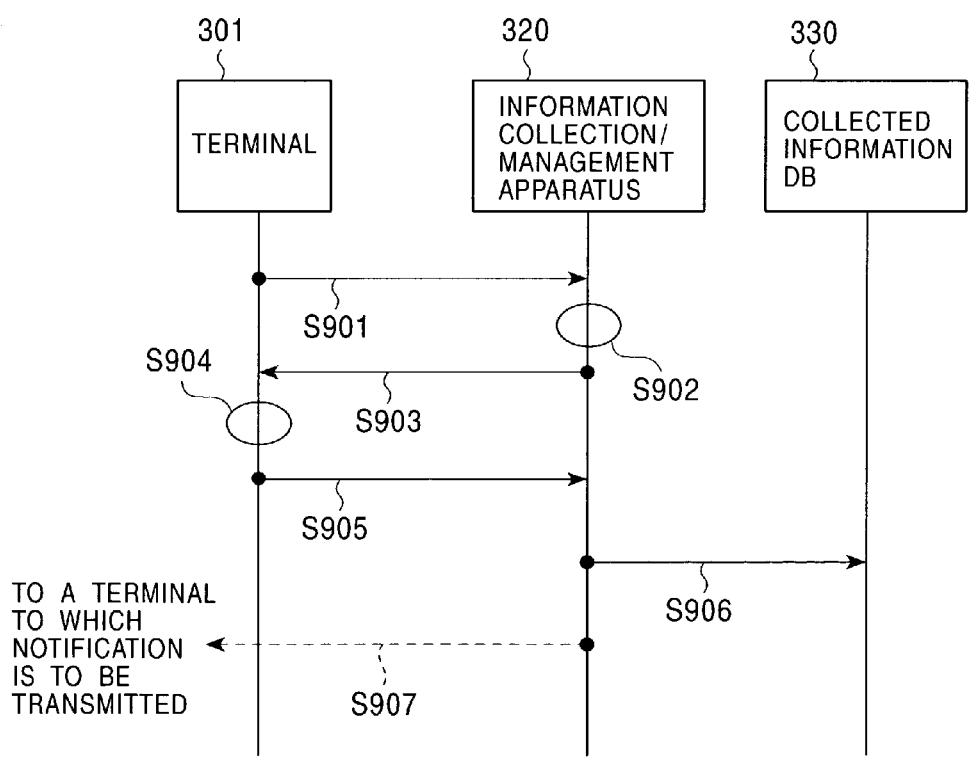
FIG. 9, is a sequence diagram showing an example of an information registration process.

FIG. 9 is a sequence diagram showing an example of the information registration process. First, a request for registering collected information is issued from the terminal device 301 (taken as a representative terminal device) (step 901). In the information collection/management apparatus 320, information registration means 605 generates an input interface for use in registering collected information (step 902). The generated input interface is transmitted to the terminal device (step 903).

Figure 10:
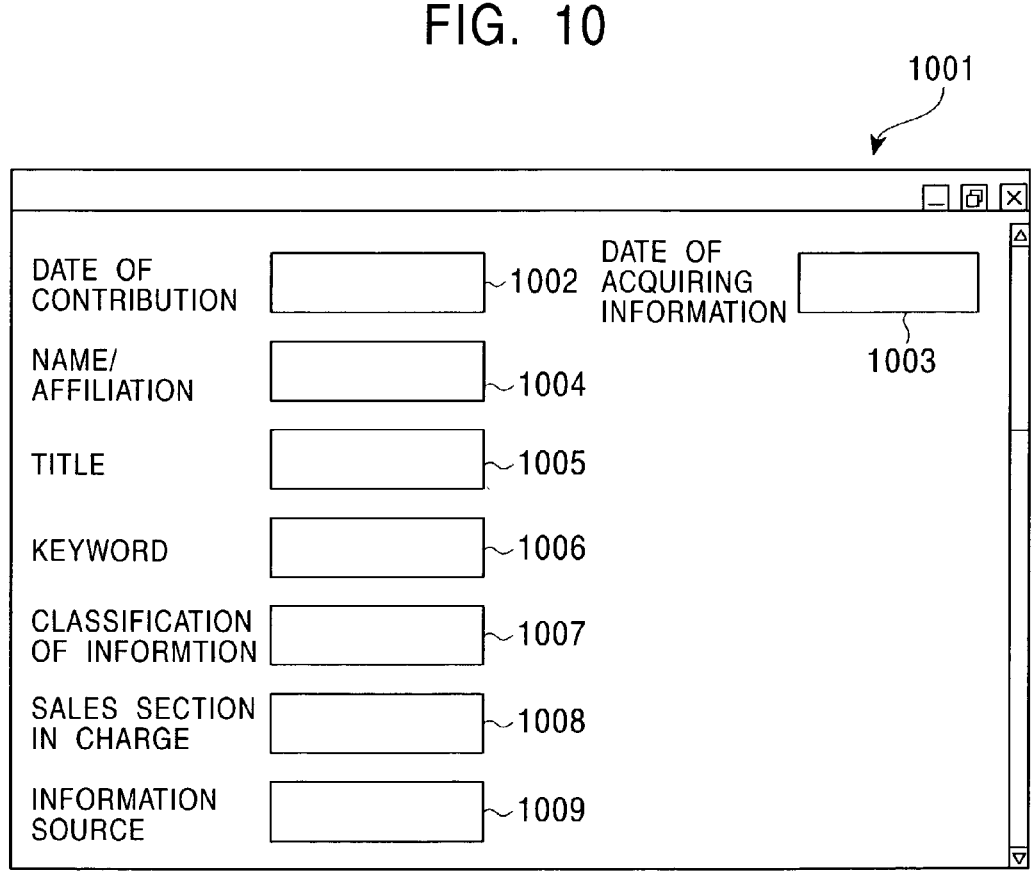
FIG. 10 is a diagram showing an example of an input interface screen.
Figure 11:
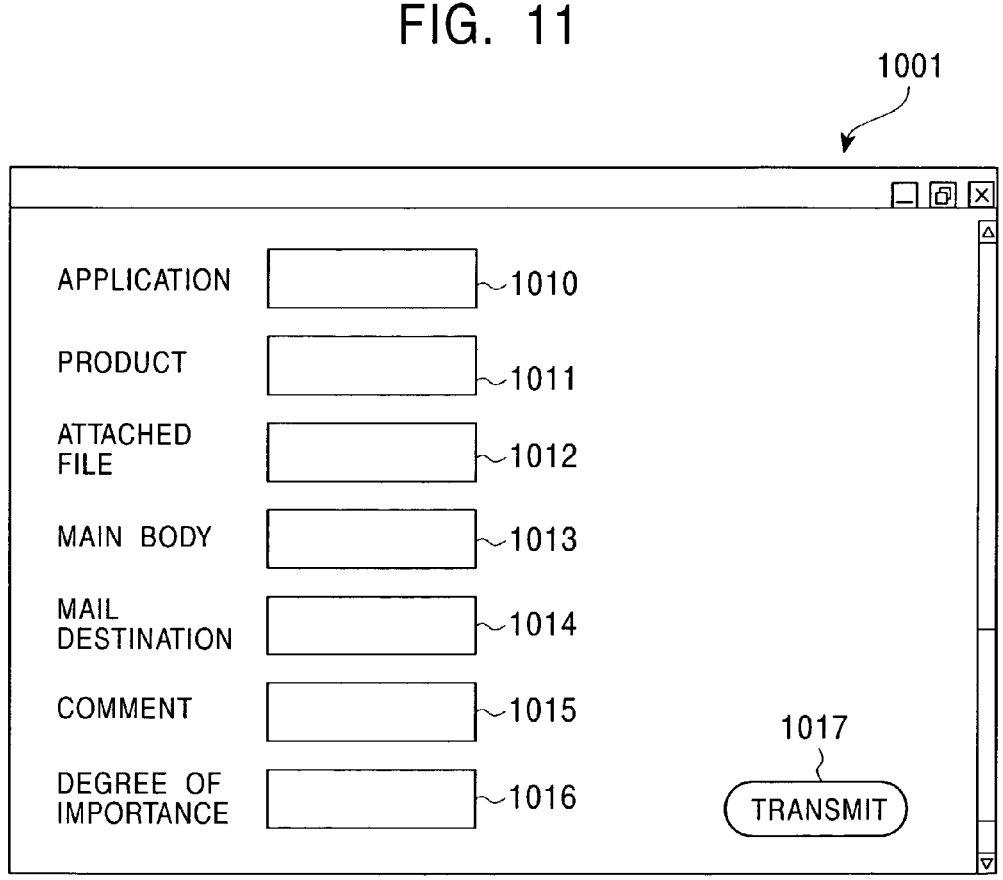
FIG. 11 is a diagram showing the example of the input interface screen.

An example of an input interface screen is shown in FIGS. 10 and 11. FIGS. 10 and 11 show different parts of the same input interface screen. More specifically, FIG. 10 shows a first half part and FIG. 11 shows a second half part.

As shown in FIGS. 10 and 11, the input interface screen is displayed in the form of a window on the terminal device. The input interface screen includes a contribution date/time input box 1002, an information acquisition date/time box 1003, an affiliation/person name input box 1004, a title input box 1005, a keyword input box 1006, a category-of-information input box 1007, a sales section input box 1008, an information source input box 1009, an application input box 1010, a product input box 1011, an attached file input box 1012, a main body input box 1013, a mail destination address input box 1014, a comment input box 1015, and a degree-of-importance input box 1016.

The degree of collected information may be linked to the degree of importance in SMTP mails.

Referring again to FIG. 9, the user of the terminal device inputs or selects information in respective boxes (step 904).

After inputting the information, if a predetermined operation (for example, pressing of a transmit button 1017) is performed, the input information is transmitted from the terminal device to the information collection/management apparatus 320 (step 905). If the information collection/management apparatus 320 receives the information, the information collection/management apparatus 320 transfers the received information as collected information to the collected-information database 330 (step 906). Data of the collected information is stored in corresponding fields as shown in FIG. 5. If the collected-information database 330 receives collected information, the collected-information database 330 stores the received collected information into a proper one of sub-databases. Although, in the present example, a sub-database is selected on the basis of the information input via the category-of-information input box 1007, a sub-database may be selected on the basis of other information.

In the case in which information is described in the mail destination input box 1014, the information collection/management apparatus 320 transmits, via the notification transmission means 607, an electronic mail to a terminal device specified by the information described in the mail destination input box 1014 (step 907).

At this stage, the information registration process (step 705 in FIG. 7) performed in response to the information registration request is completed.

Referring again to FIG. 7, if the information collection/management apparatus 320 receives a request for viewing collected information from a terminal device (step 706), the information collection/management apparatus 320 performs a process that allows the user of the terminal device to view collected information (step 707).

Figure 12:
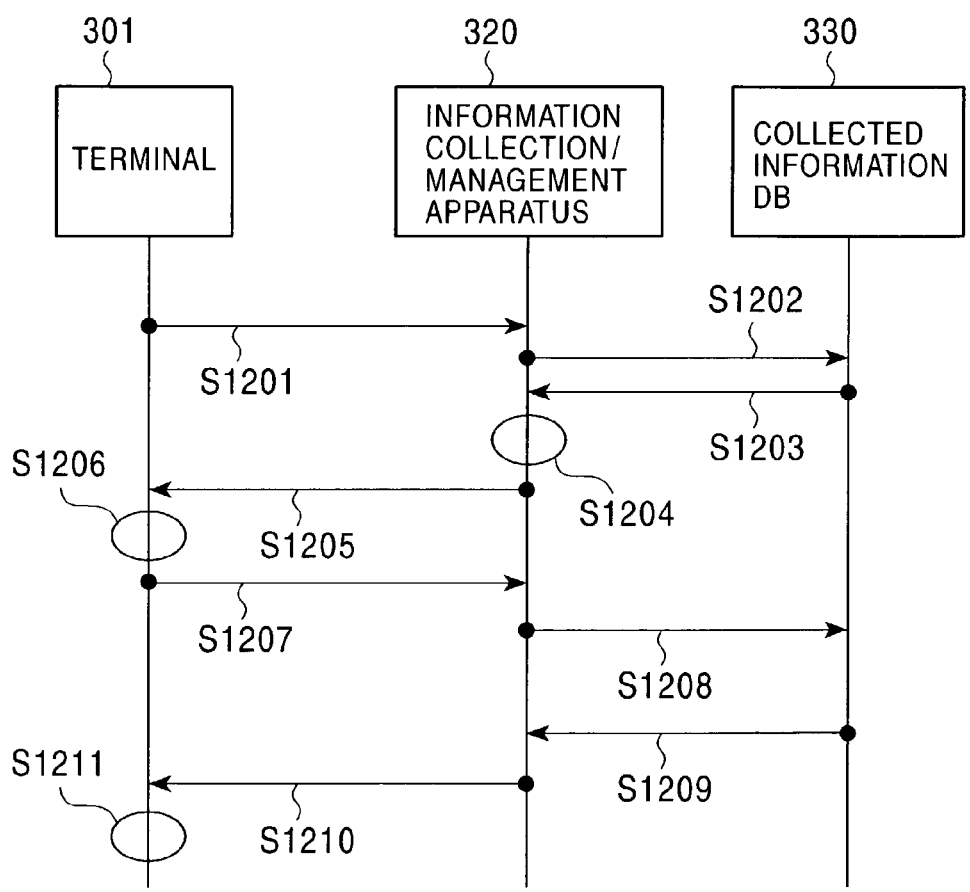
FIG. 12 is a sequence diagram showing an example of a sequence including a process of issuing an information view request and a process performed in response to the request.

FIG. 12 is a sequence diagram showing a process of issuing an information view request and a process performed in response to the request. First, a request for viewing collected information is issued from the terminal device 301 (taken as a representative terminal device) (step 1201). The information collection/management apparatus 320 inquires of the collected-information database 330 as to which pieces of collected information are allowed to be viewed by the user of the terminal device (step 1202) to receive information indicating which pieces of collected information are allowed to be viewed (step 1203). At this stage, it is not required to read the whole collected information, but it is sufficient to read a part of information, such as a title or a keyword, which can be used by the user to determine whether the whole information should be further read.

The information collection/management apparatus 320 generates, via the view request response means 606, at-a-glance information on the basis of the received information indicating which pieces of collected information are allowed to be viewed (step 1204), and transmits the generated at-a-glance information to the terminal device 301 (step 1205).

The terminal device 301 displays the at-a-glance information on the information presentation/input interface providing means 402 so that the user can view the at-a-glance information (step 1206). The user may select a piece of collected information from the at-a-glance information and may issue a request for the content of the selected piece of collected information.

If the user performs an operation (such as clicking of an icon corresponding to a desired piece of collected information) to issue a request for the content of collected information, the terminal device 301 transmits a collected information transmission request to the information collection/management apparatus 320 (step 1207).

The information collection/management apparatus 320 issues a request for the collected information specified by the user of the terminal device 301 to the collected-information database 330 (step 1208), and receives the collected information data (step 1209).

The information collection/management apparatus 320 transmits the received collected information to the terminal device 301 (step 1210). The terminal device 301 displays the received collected information so that the user can view it (step 1211).

Figure 13:
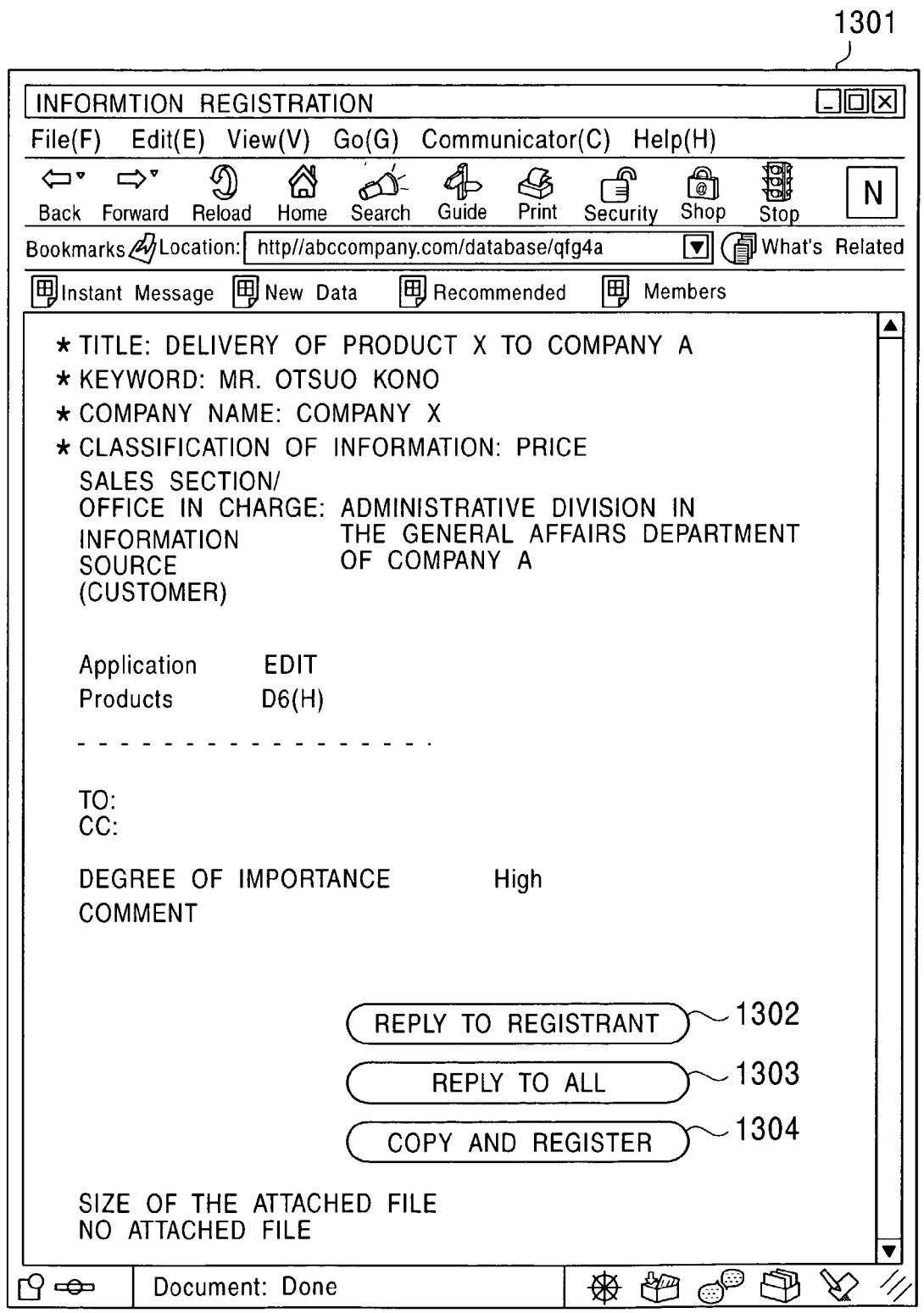
FIG. 13 a diagram showing an example of a screen for presenting, to a user, collected information received by a terminal device.

FIG. 13 shows an example of a screen displayed on the terminal device so that the user can view collected information. Part of the collected information is displayed in a display screen 1301, and the other part which is not displayed can be viewed by scrolling the screen using a scroll bar or the like. In this specific example, the entire information included in the collected information can be viewed. Although the collected information includes no attached file in the present example, any electronic file such as an image file may be attached, as described earlier.

At this stage, the process of issuing an information view request and the process performed in response to the request are completed.

Referring again to FIG. 7, if the information collection/management apparatus receives an access end request from the terminal device (step 708), the information collection/management apparatus ends the process (step 709), and the information collection/management apparatus enters a waiting state. When no access end request is issued, the above-described process is performed in response to an information registration request or an information view request, which will be further issued (steps 704, 705, 706, and 707).

Relating of Information

Relating between a plurality of pieces of information is described below. In the present embodiment, relationship between a piece of collected information and another relevant piece of collected information can be recorded. In the specific example shown in FIG. 13, the screen for presenting collected information to a user includes objects 1302, 1303, and 1304.

The object 1302 has a capability of transmitting a request for registration of new collected information (collected information B) as a response to collected information (collected information A) displayed on the screen 1301 and further transmitting a message to an information registrant of the collected information A to notify that related collected information has been registered. That is, if the object 1302 is activated by means of, for example, clicking, a request for registering collected information B together with data indicating that the collected information B is relevant to the collected information A is transmitted to the information collection/management apparatus 320. In response to the registration request, the information collection/management apparatus 320 performs the registration process as described earlier.

That is, if the information collection/management apparatus 320 receives the registration request, the information collection/management apparatus 320 supplies, to the terminal device which has issued the request for registration of the collected information B by activating the object 1302, information (in the form of, for example, an HTML file) including the data of the input interface screen (FIGS. 10 and 11). In this specific case, information identifying the collected information A is stored in the related-information identifier field 510 (FIG. 5) of the record of the collected information B. That is, the relationship between the collected information A and the collected information B is indicated by the information stored in the related-information identifier field 510.

The information registration means 605 of the information collection/management apparatus 320 describes a mail address of the information registrant of the collected information A into a mail destination address field 1014 of the input interface screen to be supplied. If the notification transmission means 607 of the information collection/management apparatus 320 receives information input via the input interface screen displayed on the terminal device, the notification transmission means 607 reads the mail address input in the mail destination address field 1014, generates electronic mail data for notifying the information registrant of the collected information A that the collected information B related to the collected information A has been registered, and transmits the electronic mail data to the mail address described in the mail destination address field 1014. By automatically describing the mail address of the information registrant of the collected information A, it becomes possible to automatically notify the information registrant of the collected information A that the related collected information B has been registered.

The object 1303 has a capability of issuing a request for registering the collected information B which is displayed on the screen 1301 and which is relevant to the collected information A, and further transmitting a message indicating that the relevant collected information has been registered to the information registrant of the collected information A and also to all users who has been notified of registration of the collected information A. If the object 1303 is activated by means of, for example, clicking, a request for registration of the collected information B is transmitted from the terminal device to the information collection/management apparatus 320, and, in response, the information collection/management apparatus 320 performs the registration process as described earlier.

That is, if the information collection/management apparatus 320 receives the registration request, the information collection/management apparatus 320 supplies, to the terminal device which has issued the request for registration of the collected information B by activating the object 1303, information (in the form of, for example, an HTML file) including the data of the input interface screen (FIGS. 10 and 11). In this specific case, information (e.g., collected information ID) identifying the collected information A is stored in the related-information identifier field 510 (FIG. 5) of the record of the collected information B. That is, the relationship between the collected information A and the collected information B is indicated by the information stored in the related-information identifier field 510.

The information registration means 605 of the information collection/management apparatus 320 describes, in the mail destination address field 1014 of the input interface screen to be supplied, a mail address of the information registrant of the collected information A and also mail addresses described in the mail destination field 509 of the data record of the collected information A. If the notification transmission means 607 of the information collection/management apparatus 320 receives information input via the input interface screen displayed on the terminal device, the notification transmission means 607 reads the mail addresses input in the mail destination address field 1014, generates electronic mail data for notifying the information registrant of the collected information A and users specified as receivers of a notification regarding the collected information A that the collected information B related to the collected information A has been registered, and transmits the generated electronic mail data to the respective mail addresses. By automatically describing the mail addresses as described above, it becomes possible to automatically notify the information registrant of the collected information A and also the users specified as receives of a notification regarding the collected information A that the relevant collected information B has been registered.

Although, in the specific example described above, when the object 1303 is activated, the mail addresses acquired from the mail destination field 509 of the data record of the collected information A are employed as the mail addresses of users specified as receivers of notification regarding the collected information A and described into the mail destination address field 1014, mail addresses of "relevant third parties" of the information registrant may be read from the related mail address table 609 described above and described into the mail destination address field 1014.

The object 1304 has a capability of issuing to the information collection/management apparatus 320 a request for registration of new collected information (collected information C) created based on the content of the collected information A displayed on the screen 1301. In this case, the information collection/management apparatus 320 is not informed that the collected information C is relevant to the collected information A, and thus no information identifying the collected information A is stored in the related-information identifier field of the record of the collected information C.

Scoring of Information

When a user views collected information, the user may give a score to the collected information depending on its content. If the object 1302 shown in FIG. 13 is activated to issue a request for registration of new collected information (collected information B) in response to the collected information (collected information A) displayed on the screen 1301, the information collection/management apparatus 320 provides the input interface for use in registration of collected information, such as that shown in FIGS. 10 and 11. This input interface further includes a score input box (not shown in FIGS. 10 and 11) so that a user can input a score indicating evaluation of the collected information via the score box. The input score is stored into the score information field (field 511 shown in FIG. 5) of the collected information data. Because the score is stored together with the related information, it is possible to extract the score given by the sender of the related information.

As described above in detail, the information collection/management system according to the present invention makes it possible to transmit information in real time and also makes it possible for a user to view information useful in various business situations without awareness of the sub-databases.

Furthermore, it also becomes possible to notifies particular users specified by an information registrant that information has been registered.

When a user views or uses existing collected information, the user may create new collected information by adding some useful information to the existing collected information. Relationships among registered pieces of collected information are recorded and managed, and those pieces of collected information related to each other are displayed, for example, in the form of a tree structure so that a user can visually understand the relationships among those pieces of collected information when the user registers or views information.

Furthermore, it becomes possible to evaluate collected information on the basis of scores given by users. This also makes it possible to quantitatively evaluate departments, sections, or persons in a company.

What is claimed is:

1. An information collection/management apparatus, comprising:

information registration means for, in response to an information registration request from a terminal device, generating an interface for use in registering new collected information depending on information type/category, transmitting the resultant interface to the terminal device, classifying the new collected information by business category, storing, into predetermined storage means, the new collected information transmitted from the terminal device in response to the transmission of the interface, depending on the business category, storing information identifying any previously registered collected information that the new collected information is related to, and transmitting a message to the terminal device, the message comprising information notifying that the new collected information has been registered;

notification transmission means for receiving information identifying an information registrant from the information registration means, acquiring a relevant mail address corresponding to the information registrant, automatically generating an electronic mail addressed to the relevant mail address, and storing the relevant mail address;

view request response means for generating at-a-glance information in response to a collected-information view request from a terminal device, transmitting the generated at-a-glance information to the terminal device, acquiring collected information indicated by information identifying collected information returned by the terminal device in response to the transmission of the at-a-glance information, and transmitting the acquired collected information to the terminal device;

access right management means for supplying, to the view request response means, information indicating which piece of collected information is allowed to be viewed by a user of a terminal device, according to a predetermined right of access;

score information providing means for, in response to a score information view request from a terminal device, retrieving a score that reflects usefulness of information for each piece of new collected information registered by at least one of business departments, sections, or personnel, calculating a total score by summing up all the scores, and providing the total score; and analysis means for receiving the total score from the score information providing means, adding the total score to a user total score of the information registrant of the new collected information, and determining if the information registrant registers useful information based on the user total score.

2. The information collection/management apparatus according to claim 1, further comprising notification transmission means for, if the new collected information received from a terminal device includes information specifying a mail receiver, acquiring information regarding the specified mail receiver from the information registration means and automatically generating an electronic mail addressed to the specified mail receiver.

3. The information collection/management apparatus according to claim 1, wherein all the scores are from a viewpoint specified by the score information request.

4. A computer readable media storing a program for causing a computer to perform a method for providing a total score for collected information, the method comprising:

generating, in response to an information registration request from a terminal device, an interface for use in registering new collected information;

transmitting the resultant interface to the terminal device;

classifying the collected information by business category;

storing, into predetermined storage means, the new collected information transmitted from the terminal device in response to the transmission of the interface, depending on the business category;

storing information identifying any previously registered collected information that the new collected information is related to;

transmitting a message to the terminal device, the message comprising information notifying that the new collected information has been registered;

receiving information identifying an information registrant at the terminal device;

acquiring a relevant mail address corresponding to the information registrant;

automatically generating an electronic mail addressed to the relevant mail address;

storing the relevant mail address;

generating at-a-glance information in response to a collected-information view request from a terminal device;

transmitting the generated at-a-glance information to the terminal device;

acquiring collected information indicated by information identifying collected information returned by the terminal device in response to the transmission of the at-a-glance information;

determining if a user of the terminal device is allowed to view the new collected information based on a predetermined right of access;

transmitting the new collected information to the terminal device if the determination is positive;

calculating the total score for the new collected information, in response to a score information view request from a terminal device, by retrieving a score that reflects usefulness of information for each piece of the collected information registered by at least one of business departments, sections, or personnel, and summing up all the scores;

providing the total score;

adding the total score to a user total score of the information registrant of the new collected information; and determining if the information registrant registers useful information based on the user total score.

5. The computer readable media according to claim 4, wherein the method further comprises acquiring information regarding the specified mail receiver from the information registration means and automatically generating an electronic mail addressed to the specified mail receiver if the new collected information received from the terminal device comprises information specifying a mail receiver.

6. The computer readable media according to claim 4, wherein all the scores are from a viewpoint specified by the score information request.

* * * * *